United States Patent
Humblot et al.

(10) Patent No.: US 9,851,010 B2
(45) Date of Patent: Dec. 26, 2017

(54) SEAL

(71) Applicant: Carl Freudenberg KG, Weinheim (DE)

(72) Inventors: Luc Humblot, Rosof sur Amance (FR); Dominique Lutaud, Orbigny au Mont (FR)

(73) Assignee: CARL FREUDENBERG KG, Weinheim (DE)

(*) Notice: Subject to any disclaimer, the term of this patent is extended or adjusted under 35 U.S.C. 154(b) by 0 days.

(21) Appl. No.: 13/757,873

(22) Filed: Feb. 4, 2013

(65) Prior Publication Data
US 2013/0200575 A1  Aug. 8, 2013

(30) Foreign Application Priority Data
Feb. 3, 2012 (FR) .................... 12 51011

(51) Int. Cl.
*F16J 15/32* (2016.01)
*F16J 15/3204* (2016.01)
*F16J 15/3228* (2016.01)
*F16J 15/3244* (2016.01)

(52) U.S. Cl.
CPC ....... *F16J 15/3204* (2013.01); *F16J 15/3228* (2013.01); *F16J 15/3244* (2013.01)

(58) Field of Classification Search
CPC .... F16J 15/324; F16J 15/3228; F16J 15/3268; F16J 15/3204; F16J 15/3244
USPC ................ 277/549, 570, 572, 573
See application file for complete search history.

(56) References Cited

U.S. PATENT DOCUMENTS

| | | | | |
|---|---|---|---|---|
| 3,306,622 A | * | 2/1967 | Liebig | 277/575 |
| 4,455,040 A | * | 6/1984 | Shinn | E21B 33/04 277/322 |
| 4,741,509 A | | 5/1988 | Bunch et al. | |
| 5,052,696 A | * | 10/1991 | Hatch | F16J 15/3232 277/562 |
| 5,860,656 A | * | 1/1999 | Obata et al. | 277/559 |
| 6,688,603 B2 | * | 2/2004 | vom Schemm | F16J 15/3216 277/549 |
| 6,860,486 B2 | * | 3/2005 | Hacker | A61B 5/7475 277/549 |
| 6,869,079 B2 | * | 3/2005 | Zheng | F16J 15/28 277/342 |
| 2001/0030398 A1 | * | 10/2001 | Hosokawa et al. | 277/549 |
| 2002/0089125 A1 | | 7/2002 | Hosokawa et al. | |
| 2003/0031828 A1 | * | 2/2003 | Kosty | F16J 15/3228 428/122 |
| 2004/0007826 A1 | * | 1/2004 | Lutaud | F16J 15/3228 277/549 |

(Continued)

FOREIGN PATENT DOCUMENTS

| CN | 1361367 A | 7/2002 |
|---|---|---|
| CN | 101490452 A | 7/2009 |

(Continued)

*Primary Examiner* — Nathan Cumar
(74) *Attorney, Agent, or Firm* — Leydig, Voit & Mayer, Ltd.

(57) ABSTRACT

A seal with, on the one hand, a support body in the form of a carrier ring with an axial leg and, on the other hand, a sealing washer which is placed or arranged on the carrier ring and which surrounds the axial leg on the outer periphery, said carrier ring being made of a metallic material, wherein the carrier ring is made of a sheet of the HYS type.

23 Claims, 8 Drawing Sheets

(56) References Cited

U.S. PATENT DOCUMENTS

2009/0166977 A1\* 7/2009 Lutaud ................ F16J 15/3228
277/358
2012/0018058 A1 1/2012 Antonissen et al.

FOREIGN PATENT DOCUMENTS

| DE | 3631887 | \* | 2/1988 |
|----|---------|---|--------|
| DE | 3631887 C1 | | 2/1988 |
| DE | 10293217 T5 | | 4/2004 |
| DE | 202004004317 U1 | | 7/2005 |
| DE | 102009035802 A1 | | 2/2011 |
| JP | 6185540 A | | 5/1986 |
| JP | 63203974 A | | 8/1988 |
| JP | 545336 U | | 6/1993 |
| JP | 74963 U | | 1/1995 |
| JP | 2005500482 A | | 1/2005 |
| JP | 2006125423 A | | 5/2006 |
| JP | 200875679 B2 | | 4/2008 |
| JP | 5065388 B2 | | 10/2012 |
| RU | 2328545 C2 | | 7/2008 |
| WO | WO 2008009317 A1 | | 1/2008 |

\* cited by examiner

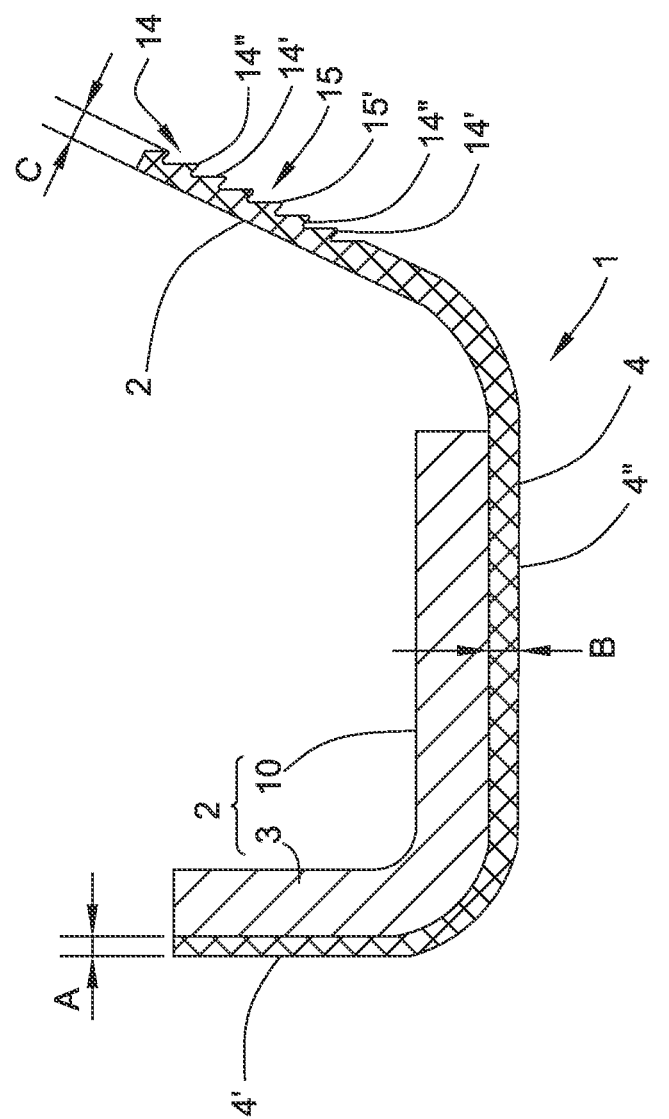

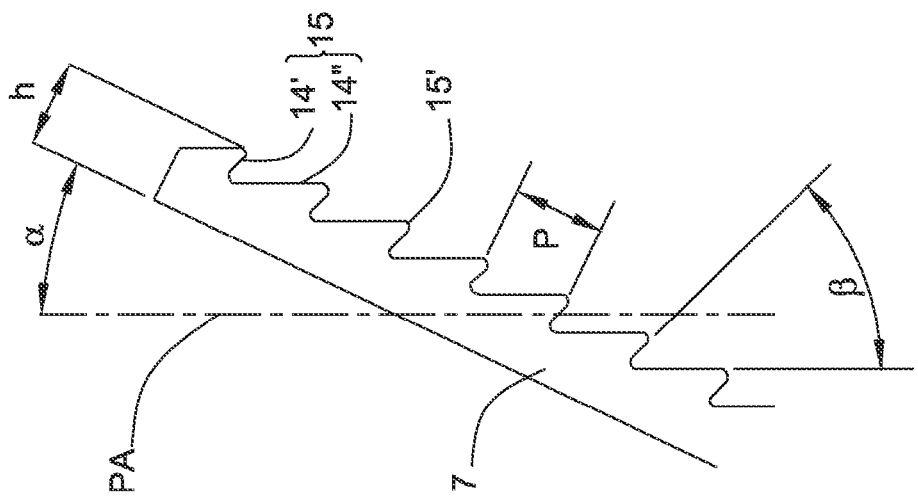
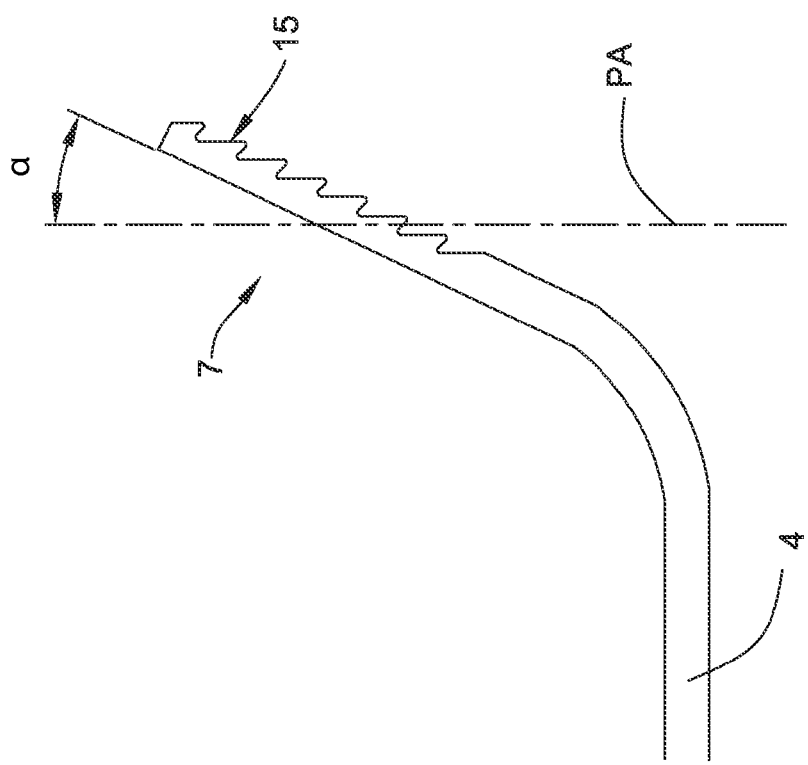

SEAL

CROSS-REFERENCE TO RELATED APPLICATIONS

Priority is claimed to French Patent Application No. FR 12 51011, filed on Feb. 3, 2012, the entire disclosure of which is incorporated by reference herein.

FIELD

The invention relates to a seal comprising a support body in the form of a carrier ring with an axial leg and a sealing washer which is placed or arranged on the carrier ring and which surrounds the axial leg on the outer periphery, preferably covering it in full.

BACKGROUND

The application relates more particularly to a seal intended to be mounted in an aperture or a similar opening in a casing or an analogous envelope in order to provide sealing between this casing and a moving machine or motor element, such as a rotary axle or shaft, passing through said aperture.

This type of seal generally has a circular structure at its external and internal peripheries, and incorporates a metallic support ring.

The art discloses seals which have a sealing washer equipped with a dynamic sealing lip consisting of a polytetrafluoroethylene (PTFE) composition. Usually, these seals comprise a static seal consisting of an elastomer material. A support body is coated there by injection-moulding of an elastomer material, the material being shaped so as to obtain a region of attachment for the dynamic sealing lip and a static seal.

Also disclosed, for example by WO-A-2008/009317, are seals in which one and the same attached sealing washer, for example consisting of a PTFE composition, forms the external or internal static seal and the internal or external dynamic sealing lip, making production easier and reducing costs in particular.

These types of seals are generally mounted in a wedged manner in a corresponding reception opening, for example an aperture or a corresponding through-opening formed in an envelope or a casing for the passage of a moving part, for example an axle or a rotary shaft.

It is advantageous, under these conditions, to be able to guarantee a rigid and wedged mounting of the seal in the aperture or the analogous reception opening, without employing any additional securing or fixing means, and simultaneously to provide the conditions for optimum static sealing between the outer periphery of the seal with a circular structure and the aperture or the analogous reception opening receiving it.

Preferably, this mounting should be able to take place with force or under radial stress, ensuring static sealing (between the ring and the housing) by compression of the part of the sealing washer secured to the axial leg.

Finally, it is desired in many applications to maintain sealing between the seal and reception opening in the case of dimensional variations, for example due to changes in temperature.

An object of the application is therefore to provide a seal of the type mentioned in the introduction of the present invention that makes it possible to satisfy the requirements expressed above.

SUMMARY

Accordingly, an aspect of the invention provides a seal, comprising: a support body including a carrier ring and an axial leg; and a sealing washer, wherein the sealing washer is arranged on the carrier ring, wherein the sealing washer surrounds the axial leg on an outer periphery, wherein the carrier ring comprises a metallic material, and wherein the carrier ring comprises a high yield strength (HYS) sheet.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 represents, seen in section, a seal of the same type as that of FIG. 1, the sealing lip having a particular shaping and the washer not protruding beyond the carrier ring;

FIG. 6A is a partial view of the end forming the sealing lip of the seal represented in FIG. 5;

FIG. 6B is a detail view, on another scale, of a portion of the sealing lip represented in FIG. 6A.

DETAILED DESCRIPTION

Figure 1:
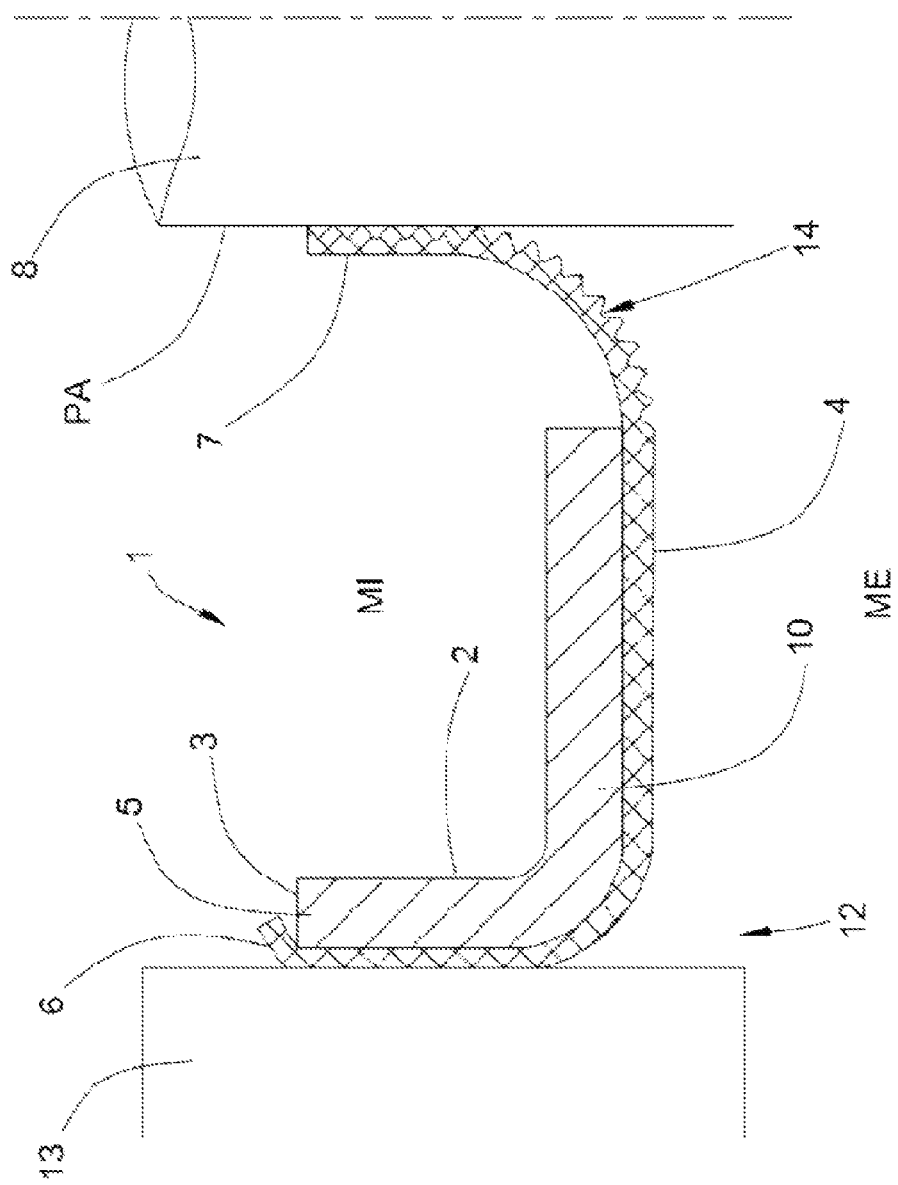
FIG. 1 represents, seen in section, a seal with a sealing washer, in the mounted state, according to a first embodiment of the invention.

More specifically, the material forming the carrier ring is a cold-rolled sheet with a high yield strength (HYS) according to the standard EN 10268, advantageously with a yield strength Re such that Re 210 N/mm$^2$ and with a tensile yield strength Rm such that Rm≥350 N/mm$^2$, preferably a sheet corresponding to the designation HC340LA or the like.

For the applications targeted in the present invention, the sheet forming the ring advantageously has a thickness of between 0.6 mm and 1.2 mm, preferably between 0.8 mm and 1.0 mm.

Thus, by virtue of the elasticity of the sheet forming the carrier ring, the axial leg can follow the dimensional variations of the aperture or of the opening forming the housing, for example caused by variations in temperatures, and therefore ensure that sealing in the different use phases is maintained.

To achieve the tight and wedged mounting desired, the thickness of the part of the sealing washer secured to the axial leg of the carrier ring, and which covers the whole of the outer peripheral surface of this axial leg, can be adjusted precisely, for example during the application under pressure of said washer on said leg (adhesive bonding, rolling), by regulating the intensity of the pressure applied at this leg, so as to obtain an outer diameter of the seal which is greater by a predetermined fraction than the inner diameter of the aperture or of the reception opening.

In this context of tight mounting under radial stress, a possible problem lies in the fact that the sealing washer can become detached during the mounting of the seal in the casing aperture, such that, on the one hand, the mounting is made substantially more difficult and more tedious and, on the other hand, the seal can be destroyed, or be at least partially devoid of sealing material on its outer periphery in contact with the wall of the aperture, owing to the separation of the washer at this level during the placing of the seal.

Another object of the invention is therefore to improve the seal of the type mentioned in the introduction, and for example described in document WO-A-2008/009317, such that the mounting is facilitated, and advantageously such that the risk of separation of the washer from the axial leg of the carrier ring is significantly reduced, or even eliminated.

In order to achieve this additional object, the sealing washer according to the invention protrudes beyond the free end of the axial leg and thus forms a projecting part. Preferably, the sealing washer totally covers the axial leg (that is to say the outer circumferential surface thereof) and is applied against the latter, the sealing washer being assembled by material bonding to this axial leg. Assembly by material bonding is achieved by means of a suitable adhesive product which is arranged between the carrier ring and the sealing washer.

As is illustrated by way of example in document WO-A-2008/009317, the sealing washer can be attached and secured to the carrier ring by the application of pressure or rolling, with or without heating (according to the adhesive agent in particular), after placing the adhesive.

In the absence of a projecting part, an interstice (corresponding to the visible edge of the assembly plane formed by the adhesive product) is formed between the sealing washer and the axial leg. During the mounting, and as a function of the dimensioning of the diameters of the seal and of the casing aperture, large forces act on the seal in the radial direction and in the axial direction, it having been found that the forces acting in the axial direction can in particular have the effect that the sealing washer detaches from the axial leg by shearing (the seal is introduced axially in the direction of the free end of the axial leg). Consequently, the seal can be destroyed, or at least the static sealing effect diminished.

The projecting part according to the invention overcomes these disadvantages and additionally facilitates the mounting.

Specifically, the projecting part covers the axial leg such that the forces acting in the axial direction cannot have the effect that the sealing washer detaches from the axial leg by shearing (separation). The projecting part is preferably curved radially inwardly in the direction of the mid-axis. There is thus obtained in the region of the projecting part a reduction in diameter which reduces the outer diameter of the seal in the manner of a chamfer. On the one hand, this reduction in diameter performs the task of assisting in centering, thus facilitating the positioning and the guiding (during the mounting) of the seal in the casing aperture, and, on the other hand, the axial forces in operation have the effect that the sealing washer is applied against the axial leg.

That opposes a shear stress such that the sealing washer cannot be detached from the carrier ring during the mounting. The projecting part thus constitutes circumferentially a leg of frustoconical shape, at least partially covering the end edge of the axial leg, in particular the proximal region of the outer edge.

The sealing washer preferably consists of a polytetrafluoroethylene (PTFE) composition. In order to reduce the tendency to creep, the PTFE composition can be provided with a fibre reinforcement, for example a glass fibre reinforcement, at least in the region which is associated with the axial leg. The use of PTFE as material for a static seal reduces the mounting forces since static seals made of PTFE have extremely low coefficients of friction.

By comparison with the elastomer materials, PTFE has a considerably lower elasticity. However, it has been found that PTFE is for its part also suitable for a use as a static seal. The differences in shape, which are compensated for with elastomer seals by local compression or expansion movements, are compensated for with static seals made of PTFE by a local migration of the material, that is to say by limited creep processes. However, the creep process is, within the context of the invention, preferably locally limited such that the prestress of the static seal is maintained and such that the seal is immobilized in a reliable manner in the casing aperture.

In the tight mounting conditions mentioned above, the advantages provided by the projecting part are all the more beneficial and important for a correct leaktight mounting.

During the rolling which leads to the adjusted outer diameter and to the securing of the washer on the ring, the displacement of resulting material can form, at least partially, said projecting part.

Preferably, the thickness of the washer part forming a compression seal is less than that of the part of said washer assembled with the radial leg of said ring, for example with a ratio of the order of 0.7 to 0.8, preferably about 0.75, corresponding to a reduction of the order of 20% to 30% of the thickness of this part of the washer during the rolling operation.

A sealing lip can be formed from the sealing washer for application against a machine element to be sealed, such as for example a shaft or a rotary axle. The seal according to the invention thus has, in this case, only two constituent elements: a carrier ring and a sealing washer. The sealing washer can be equipped in the region of the sealing lip with a repelling structure, for example a threaded groove. This repelling structure improves the dynamic sealing with a slight friction stress.

The thickness of the projecting helical threads, alternating with the turns of the threaded groove forming the repelling structure, is advantageously greater than that of the parts of the sealing washer respectively assembled with the axial and radial legs of the carrier ring.

For example, the thickness of said projections can be, for example, equivalent to about 1.6 to 1.7 times the thickness of the part of the sealing washer applied to the axial leg.

Figure 4:
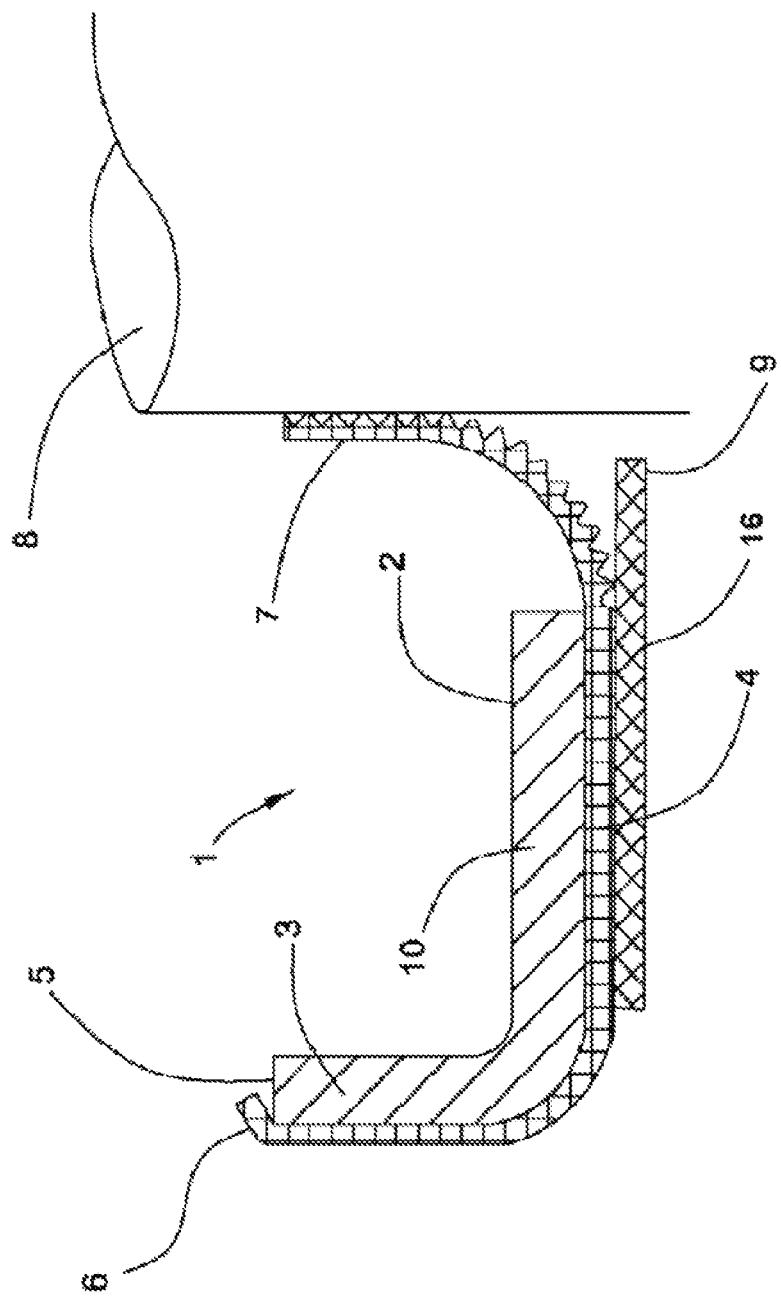
FIG. 4 represents, seen in section, a seal with a sealing washer and an element in the form of a washer, according to a fourth embodiment of the invention.

The repelling structure can advantageously be formed by impression or die stamping during the application under pressure (rolling) of the washer on the ring, as described and represented schematically for example in document WO 2008/009317 (see FIG. 4 and corresponding description).

Moreover, in an advantageous manner, this repelling structure can consist of a plurality of turns of a helical groove with a substantially triangular cross section.

This triangular cross section can have a structure or a profile which is asymmetric (with respect to the edge forming the bottom of the groove) and making it possible to provide, in a surprising manner, during the rotation of the rotating axle or shaft to be sealed, a repelling action directed towards one of the two sides or towards one of the two environments to be separated in a leaktight manner, as a function of the orientation of the asymmetry.

According to another configuration or in an additional manner, a dust-prevention lip can be formed from the sealing washer. The dust-prevention lip protrudes axially in the direction of the machine element to be sealed, but does not rest on the latter. If the sealing washer consists of a PTFE composition, the dust-prevention lip can for its part also consist of a PTFE composition.

In a variant, a sealing lip and a dust-prevention lip can be formed from the sealing washer, by separation and shaping of the internal end portion of said sealing washer.

According to another feature, a radial leg can be connected to the axial leg of the carrier ring, and the sealing washer can cover the side of the radial leg which is opposed to the axial leg. The sealing washer thus covers one side of the carrier ring. That is particularly advantageous if the side of the carrier ring which is covered by the sealing washer is acted upon by a corrosive fluid. A sealing washer consisting of a PTFE composition is resistant to a multiplicity of corrosive fluids.

An additional sealing washer, from which the sealing lip is formed, can be placed on the carrier ring. The advantage here is that the choice of materials for the sealing washer and the additional sealing washer can be optimized as a function of their respective use. The sealing washer can thus consist of a material having a particularly low tendency to creep and improved adhesion properties, whereas the additional sealing washer can consist of a material having reduced coefficients of friction.

The sealing washer can be placed on the side of the radial leg which is opposed to the axial leg, and the additional sealing washer on the side of the radial leg which is directed towards the axial leg. With this configuration, a sealing washer is placed on each side of the radial leg. That is particularly advantageous if the materials of the two sealing washers are incompatible with one another.

The sealing washer and the additional sealing washer can be placed on the side of the radial leg which is opposed to the axial leg. With this configuration, the two sealing washers are placed on the same side. One sealing washer here at least partially covers the other such that fastening is simplified since the outer sealing washer provides an additional fastening for the inner sealing washer. This configuration is also advantageous relative to the mounting, since the sealing washer from which the sealing lip is formed is subjected during the mounting to a pressure stress in the direction of the carrier ring and cannot become detached. According to an additional configuration, the sealing washer can then at least partially cover the additional sealing washer. In the case of this configuration, the dynamic sealing lip is formed from the additional sealing washer. The latter is fixed in a particularly reliable manner since the additional sealing washer, on one side, is fixed to the carrier ring and, on the other side, is covered by the sealing washer from which the dust-prevention lip is formed.

The sealing washer can be at least partially covered by an element in the form of a washer. The dust-prevention lip can be formed from this element. The element can here consist of the most varied materials: materials which can be envisaged are elastomer or metallic materials, washers made of plastic or non-woven material.

A seal 1 according to the invention is represented, in the form of different variants, in FIGS. 1 to 5 and 7.

Thus, FIG. 1 represents a seal 1 for sealing a casing aperture 12 in a casing 13. The seal 1, which separates an internal environment MI from an external environment ME, has a carrier ring 2 made of metallic material, the carrier ring 2 being provided with an axial leg 3. The seal 1 additionally has a sealing washer 4 made of a PTFE composition, which is placed on the carrier ring 2 and which surrounds the axial leg 3 on the outer periphery. A radial leg 10 is connected to the axial leg 3 of the carrier ring 2, and the sealing washer 4 covers the side of the radial leg 10 which is opposed to the axial leg 3. The sealing washer 4 is assembled to the carrier ring 2 by material bonding by means of a layer of adhesive product. The sealing washer 4 is configured such that it protrudes beyond the free end 5 of the axial leg 3 and thus forms a projecting part 6. The projecting part 6 is curved radially inwardly in the direction of the mid-axis and forms a reduction in diameter. A sealing lip 7 is additionally formed from the sealing washer for application against a machine element 8 to be sealed, having a bearing plane PA. The sealing lip 7 is provided with a repelling structure 14 in the form of a screw thread.

Figure 2:
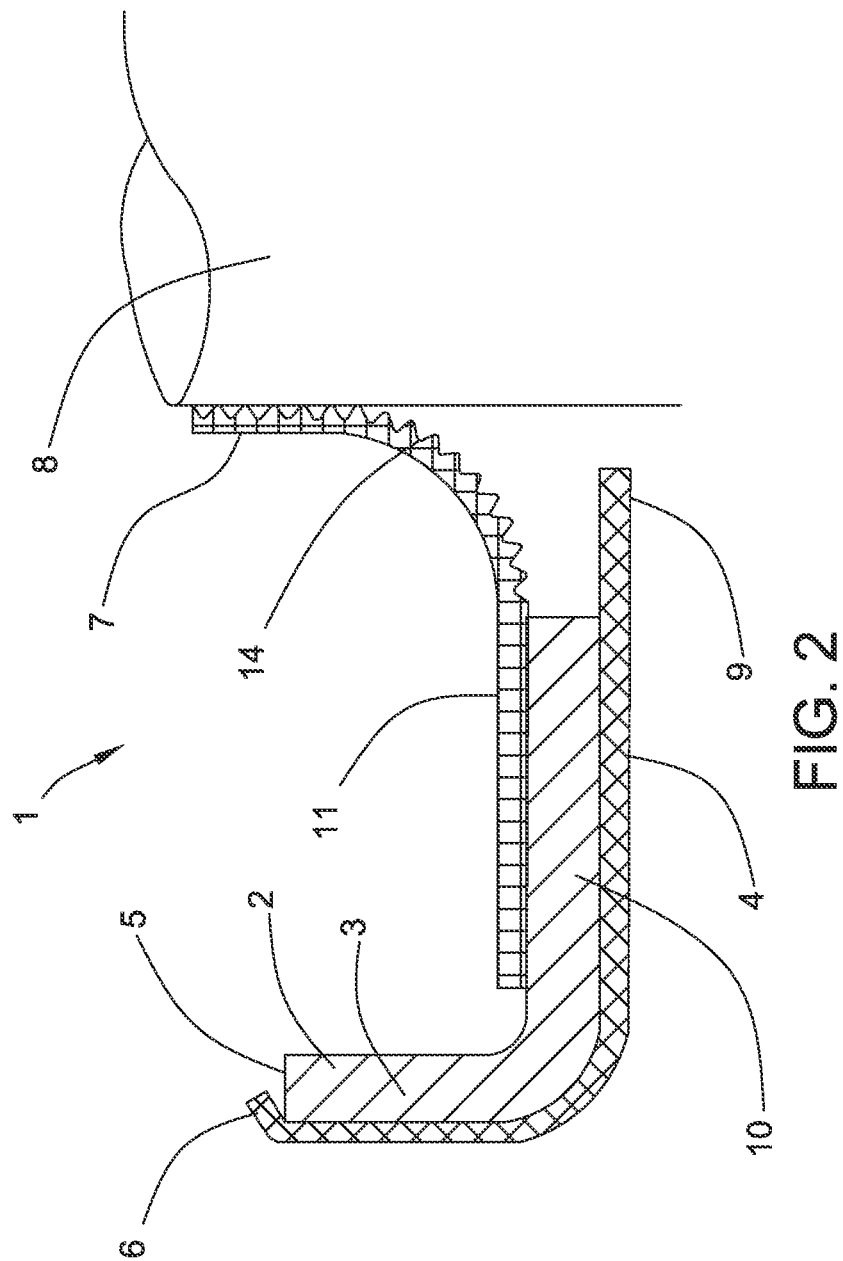
FIG. 2 represents, seen in section, a seal with a sealing washer and an additional sealing washer, according to a second embodiment of the invention.

FIG. 2 represents a seal 1 with a carrier ring 2 made of plastic material, the carrier ring 2 being provided with an axial leg 3. The seal 1 additionally has a sealing washer 4 made of a PTFE composition which is placed on the carrier ring 2 and which surrounds the axial leg 3 on the outer periphery. The sealing washer 4 is assembled to the carrier ring 2 by material bonding by means of a layer of adhesive product. The sealing washer 4 is configured such that it protrudes beyond the free end 5 of the axial leg 3 and thus forms a projecting part 6. The projecting part 6 is curved radially inwardly in the direction of the mid-axis and forms a reduction in diameter. A dust-prevention lip 9 is formed from the sealing washer 4. An additional sealing washer 11 is placed on the side of the carrier ring 2 which is opposed to the sealing washer 4, that is to say on the side of the radial leg 10 which is directed towards the axial leg 3. This additional sealing washer 11 for its part also consists of a PTFE composition. The sealing lip 7 is formed from the additional sealing washer 11. The sealing lip 7 is provided with a repelling structure 14 in the form of a screw thread.

Figure 3:
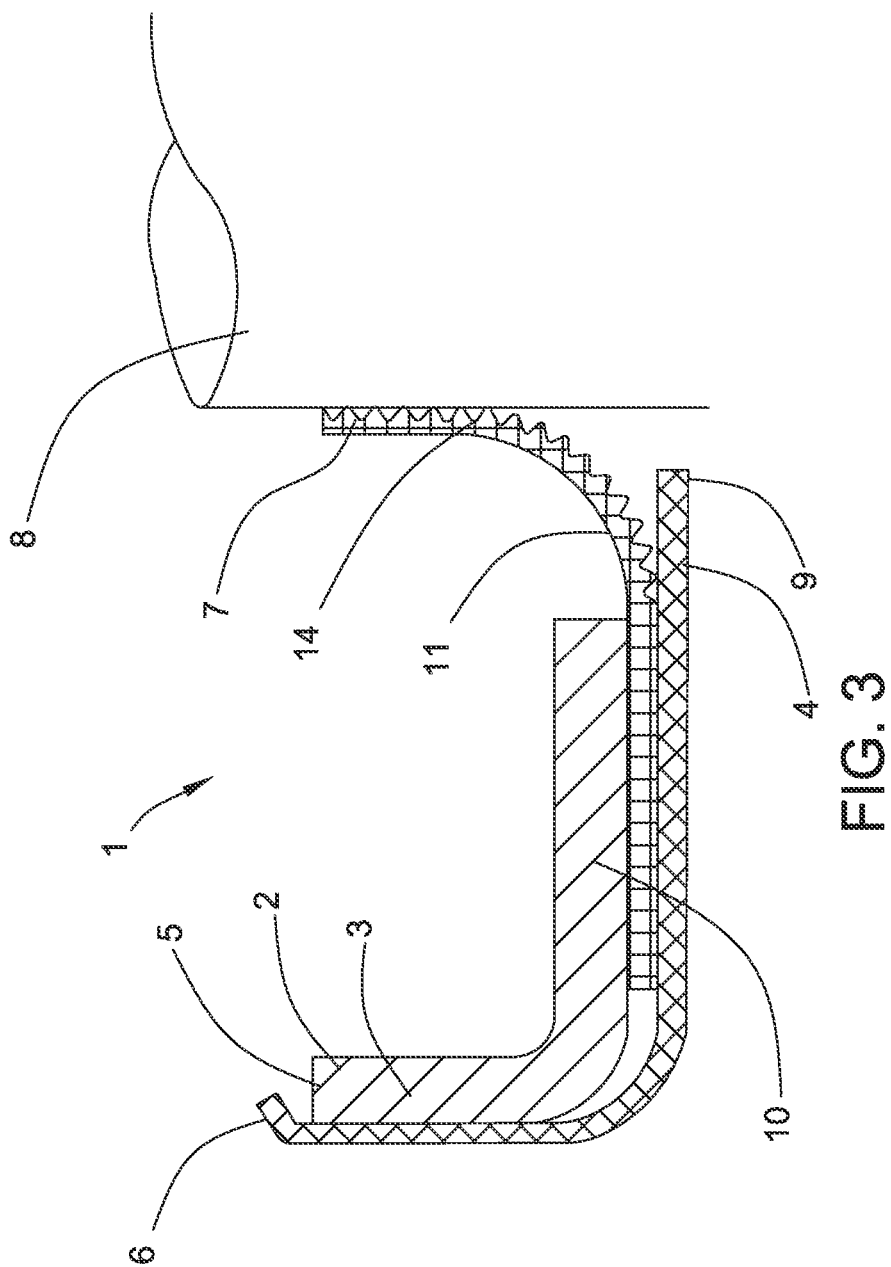
FIG. 3 represents, seen in section, a seal in which case the sealing washer covers the additional sealing washer, according to a third embodiment of the invention.

FIG. 3 represents a seal 1 according to FIG. 2, the sealing washer 4 and the additional sealing washer 11 being placed on the side of the radial leg 10 which is opposed to the axial leg 3, and the sealing washer 4 at least partially covering the additional sealing washer 11.

FIG. 4 represents a seal 1 according to FIG. 1, an element in the form of a washer 16, which partially covers the sealing washer 4, being fastened to the sealing washer 4 on the side opposed to the radial leg 10. A dust-prevention lip 9 is formed from the element 16, and the element consists of a non-woven.

FIG. 5 represents a seal 1 of the same type as that represented in FIG. 1 or FIG. 4 (in the latter case with a dust-prevention lip 9 in addition), but not provided with a projecting part 6, and the various identical constituent parts are indicated by the same reference numerals.

FIG. 5 illustrates more explicitly that the part 4' of the sealing washer 4 assembled with the axial leg 3 can have an adjusted thickness, in particular less than the thickness of the part 4" of said washer 4 assembled with the radial leg 10 of said ring.

In particular, the thickness A of the part 4' can be of the order of 0.75 B, where B is the thickness of the part 4".

Likewise, the thickness A of the part 4' is less than the thickness C of the projecting turns 15' of the repelling structure 14, alternating with the recessed turns forming the groove 15.

Advantageously, the thicknesses A and C can substantially verify the relation A=0.6 C.

In the absence of stress, and for a seal 1 intended to be mounted in a cylindrical circular reception opening 12, the axial leg 3 advantageously forms a slightly frustoconical sleeve which flares in the direction of the free end of said leg 3. Advantageously, the flare angle can be between 0.5° and 5.0°, the outer diameter of the seal 1 at right angles to the radial leg 10 being substantially identical to the internal diameter of the opening or of the aperture 12.

Thus, the seal 1 is mounted in the opening 12 with an elastic bending stress at the leg 3, thus ensuring a locking in position and a guaranteed application under pressure of the part of the sealing washer 4 covering the leg 3 against the internal wall of the opening 12.

As is illustrated also in FIG. 5, and more precisely still in FIGS. 6A and 6B, and according to an advantageous feature of the invention, the sealing lip 7 can have a helical repelling structure 14 in the form of a screw thread, consisting of a groove 15 with opposite flanks 14', 14" of different inclinations, preferably with a cross section or profile of substantially asymmetric triangular shape.

According to the invention, this groove 15 comprises a first flank or side 14' inclined with a smaller slope and a second flank or side 14" inclined with a larger slope, with respect to the bearing plane PA when the sealing lip 7 is applied against the machine element 8 to be sealed.

Preferably, the first flank 14', with a smaller slope, of the turns of the groove 15 forming the repelling structure 14 is oriented, after placing the seal 1 in the aperture 12 intended to receive it and applying the lip 7 against the machine element 8, towards the external environment ME, the second flank 14", with a larger slope, being oriented towards the internal environment MI to be sealed.

Such a shaping of the repelling structure 14 makes it possible to provide a dynamic seal having a preferential repelling direction oriented towards the environment to be sealed.

FIGS. 6A and 6B illustrate, by way of non-limiting example, a possible practical embodiment of the groove 15 forming the repelling structure 14.

The angle of inclination a of the sealing lip 7 with respect to the plane PA, in the absence of stress, can be between 15° and 75°.

The angular opening β of the groove 15 with triangular cross section (that is to say the angle formed by the first and second flanks 14' and 14") can be between 60° and 120°.

Moreover, the pitch p of the helix forming the repelling structure can be between 0.2 mm and 1.0 mm, whereas the depth h of the groove 15 (distance between the bottom of the groove 15 and the top of the projections 15' between the turns of the groove) can be between 0.05 mm and 0.5 mm.

Figure 7:
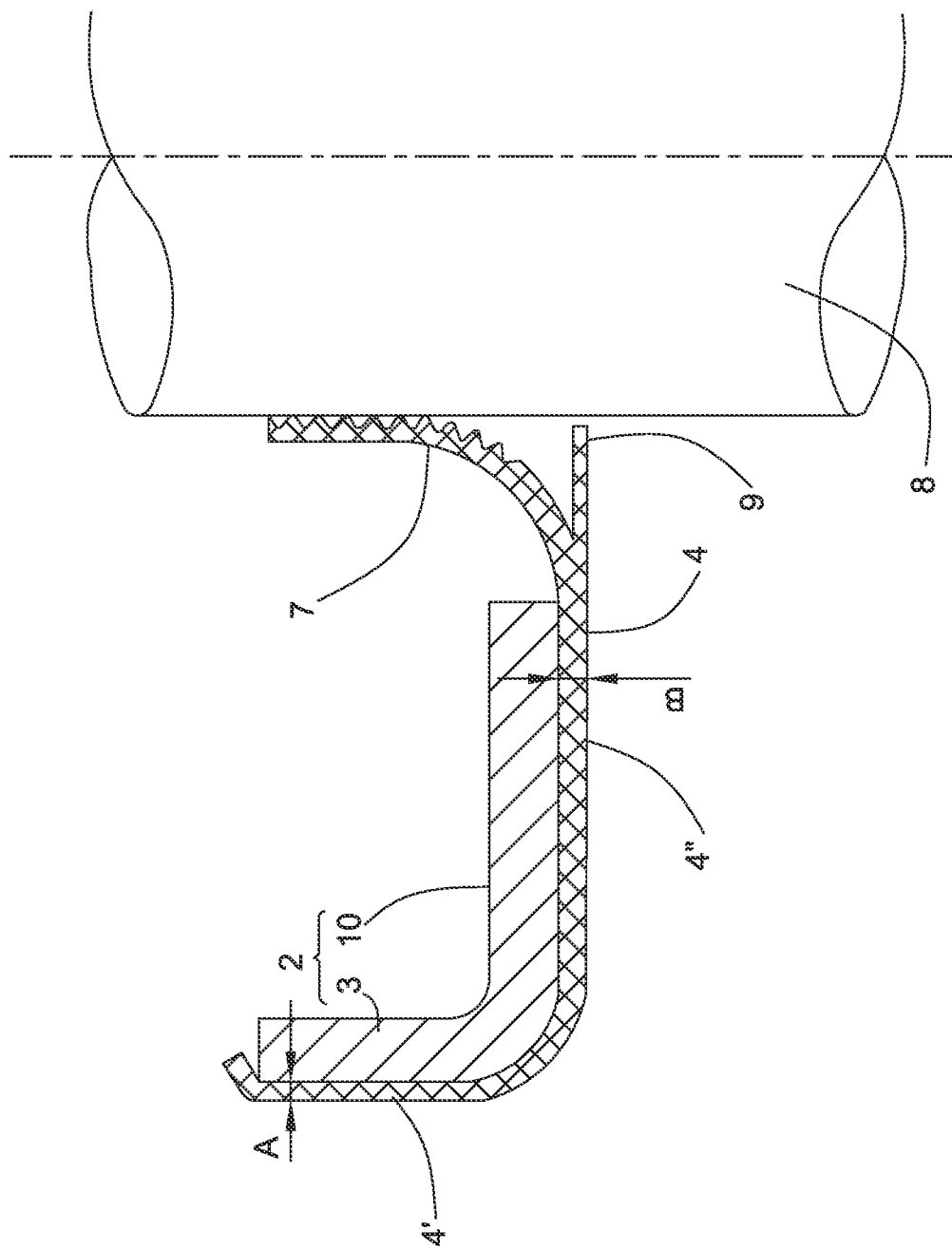
FIG. 7 represents, seen in section, a seal constituting a variant of the embodiment represented in FIG. 1.

FIG. 7 represents a variant embodiment of the seal 1 of FIG. 1, in which a sealing lip 7 and a dust-prevention lip 9 are formed from the same sealing washer 4, by suitable subdivision and shaping of the portion forming the inner edge of said washer 4.

Figure 8:
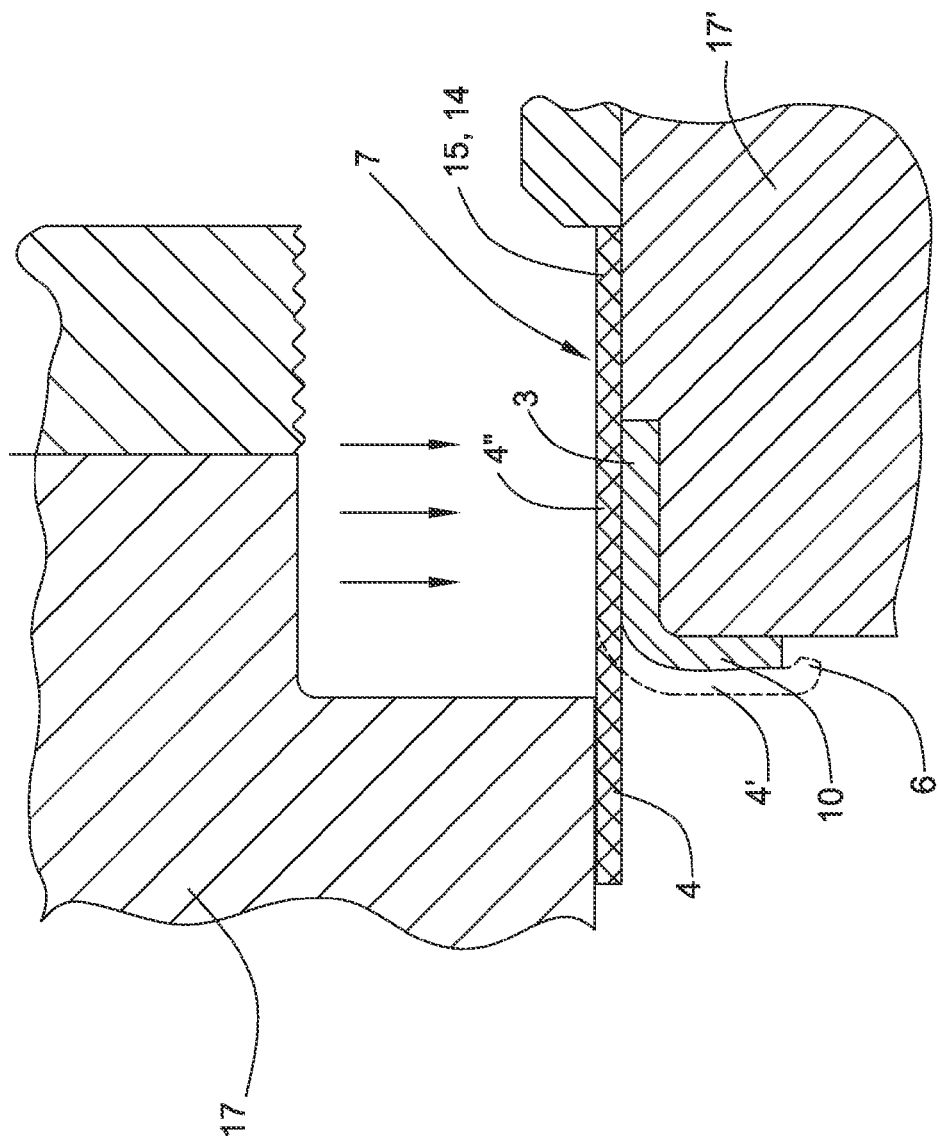
FIG. 8 represents, schematically and seen in section, an installation for the production of a seal as represented in FIG. 1.

FIG. 8 illustrates, schematically and seen in section, an installation for the production of a seal 1 as represented in FIG. 1 in particular, starting from a carrier ring 2 of L-shaped cross section and a sealing washer 3. A person skilled in the art will understand that, during the closure of the mould (bringing the two parts 17 and 17' together), the washer 4 is rolled on the ring 2 with simultaneous formation, on the one hand, of the projecting part which protrudes beyond the internal edge of the radial leg 10, and, on the other hand, the repelling structure 14 on the lip 7.

Of course, the invention is not limited to the embodiments described and represented in the appended drawings. Modifications remain possible, in particular from the point of view of the constitution of the various elements or by substitution of technical equivalents, without thereby departing from the scope of protection of the invention. Furthermore, the specific features of the different variant embodiments can be combined with one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

The invention claimed is:

1. A seal for sealing a space between a casing and a machine element, the seal comprising:

a carrier ring comprising an axial leg and a radial leg; and a sealing washer comprising a polytetrafluoroethylene (PTFE) composition, wherein the sealing washer is arranged on the carrier ring and is bonded to the carrier ring with an adhesive product, wherein the sealing washer protrudes beyond a free end of the axial leg and thus forms a projecting part, the projecting part being configured such that a force acting in an axial direction cannot detach the sealing washer from the axial leg by shearing, wherein the projecting part is bent radially inwardly so that its outer surface forms circumferentially a frustoconical shape, not contacting an end edge of the axial leg, wherein the polytetrafluoroethylene (PTFE) composition of the sealing washer surrounds and extends beyond the axial leg of the carrier ring on a radially outer periphery of the axial leg of the carrier ring, so as to contact the casing and prevent the carrier ring from contacting either of the casing and the machine element, and wherein the carrier ring comprises a high yield strength (HYS) sheet, comprising a metallic material, with a yield strength Re of at least 210 N/mm$^2$.

2. The seal of claim 1, wherein a first portion of the sealing washer, assembled with the axial leg, has a thickness such that an outer diameter of the seal is greater than an inner diameter of the space to be sealed.

3. The seal of claim 1, wherein a sealing lip is formed from the sealing washer, wherein the sealing lip is configured for application against the machine element to be sealed.

4. The seal of claim 1, further comprising:
a dust-prevention lip,
wherein the dust-prevention lip is adjacent to the sealing washer.

5. The seal of claim 4, wherein the sealing lip and a dust-prevention lip are formed from the sealing washer, by separation and shaping an internal end portion of the sealing washer.

6. The seal of claim 1, wherein the radial leg connects to the axial leg,
wherein the sealing washer covers a side of the radial leg opposite the axial leg or opposite an extension direction of the axial leg.

7. The seal of claim 1, further comprising:
an additional sealing washer comprising polytetrafluoroethylene (PTFE),
wherein the additional sealing washer does not contact the sealing washer,
wherein a sealing lip is formed from the additional sealing washer,
wherein the additional sealing washer is arranged on an internal environment side of the carrier ring.

8. The seal of claim 7, wherein the sealing washer is placed on the side of the radial leg opposite the axial leg, and
wherein the additional sealing washer is placed on a side of the radial leg directed towards the axial leg.

9. The seal of claim 7, wherein the sealing washer and the additional sealing washer are both placed on the side of the radial leg opposite the axial leg.

10. The seal of claim 9, wherein the sealing washer at least partially covers the additional sealing washer.

11. The seal of claim 1, wherein the sealing washer is at least partially covered by an element in the form of a washer.

12. The seal of claim 11, wherein the element, comprising a free end directed towards the machine element to be sealed, is configured as a dust-prevention lip.

13. The seal of claim 3, wherein the sealing lip includes a repelling structure,
wherein the repelling structure is helical or in the form of a screw thread, comprising a groove with opposite flanks of different inclinations.

14. The seal of claim 13, wherein the groove comprises
a first flank, which is inclined with a smaller absolute slope with respect to a bearing plane when the sealing lip is applied against the machine element to be sealed, and
a second flank, which is inclined with a larger absolute slope, with respect to the bearing plane when the sealing lip is applied against the machine element to be sealed.

15. The seal of claim 14, wherein the first flank of turns of the groove forming the repelling structure, after placing the seal in an aperture intended to receive the seal and applying the lip against the machine element to be sealed, is oriented towards an external environment, and
wherein the second flank is oriented towards an internal environment to be sealed.

16. The seal of claim 2, wherein the thickness of the first portion is less than a thickness of a second portion of the sealing washer, which second portion is assembled with the radial leg of the carrier ring.

17. The seal of claim 1, wherein the sealing washer consists of the polytetrafluoroethylene (PTFE) composition.

18. The seal of claim 1, wherein the polytetrafluoroethylene (PTFE) composition of the sealing washer further surrounds and extends beyond the radial leg of the carrier ring on an outer periphery of the radial leg of the carrier ring.

19. The seal of claim 1, configured to form a static seal and a dynamic seal,
wherein the static seal is formed by an outer periphery of the sealing washer contacting a surface of an object to be sealed, and an inner periphery of the sealing washer, via the adhesive product, contacting the carrier ring.

20. The seal of claim 1, wherein the projecting part only partially covers the end edge of the axial leg.

21. The seal of claim 1, wherein the sealing washer totally covers only an outer circumferential surface of the axial leg, the outer circumferential surface facing an external environment.

22. The seal of claim 1, wherein the sealing washer totally covers an outer circumferential surface of the axial and radial legs.

23. The seal of claim 1, wherein the radially and axially outer periphery the sealing washer directly contacts an external environment.

* * * * *